United States Patent [19]

Chester

[11] 4,219,786
[45] Aug. 26, 1980

[54] POLARIZATION SUPPRESSION OF PARASITIC MODES

[75] Inventor: Arthur N. Chester, Malibu, Calif.

[73] Assignee: The United States of America as represented by the Secretary of the Army, Washington, D.C.

[21] Appl. No.: 968,131

[22] Filed: Dec. 11, 1978

[51] Int. Cl.$^3$ .............................................. H01S 3/081
[52] U.S. Cl. ........................... 331/94.5 C; 331/94.5 T
[58] Field of Search ...................... 331/94.5 C, 94.5 D, 331/94.5 T

[56] References Cited

U.S. PATENT DOCUMENTS

| | | | |
|---|---|---|---|
| 3,798,571 | 3/1974 | Segre | 331/94.5 T |
| 4,050,035 | 9/1977 | Wuerker et al. | 331/94.5 C |
| 4,065,732 | 12/1977 | Scammell | 331/94.5 C |
| 4,156,852 | 5/1979 | Hagen | 331/94.5 C |

OTHER PUBLICATIONS

Manuceia et al., The Properties and Application of Diffraction Gratings in Frequency Selective Laser Resonators, IEEE J. Quant. Elect., vol. 6 (Mar. 1970) p. 185.
Wirgin et al., Theoretical and Experimental Investigation of a New Type of Blazed Grating, J.O.S.A., vol. 59, No. 10 (Oct. 1969) pp. 1348-1357.
Gerry, Gasdynamic Lasers, IEEE Spectrum (Nov. 1970) pp. 51-58.
Banse et al., Nonresonant Continuous Laser Oscillation in the Visible, Physics Letters, vol. 28A (Oct. 1968) pp. 6-7.
Cool et al., Operating Characteristics of a Transverse-Flow $DF-CO_2$ Purely Chemical Laser, Appl. Phys. Let., vol. 17, No. 7 (Oct. 1, 1970) pp. 278-281.
Cool et al., HCl, HF, and DF Partially Inverted cw Chemical Lasers, J. Appl. Phys., vol. 41, No. 10 (Sep. 1970) pp. 4038-4050.

Primary Examiner—William L. Sikes
Attorney, Agent, or Firm—Nathan Edelberg; Robert P. Gibson; Fred M. Bush

[57] ABSTRACT

In a multi-pass laser optical system orthogonal polarization of any two immediately adjacent optical passes allows suppression of internal parasitics caused by overlap of laser radiation on successive passes through a laser oscillator or amplifier, allowing increased operating efficiency and closer spacing of adjacent optical paths.

6 Claims, 6 Drawing Figures

POLARIZATION SUPPRESSION OF PARASITIC MODES

DEDICATORY CLAUSE

The invention described herein was made in the course of or under a contract or subcontract thereunder with the Government and may be manufactured, used, and licensed by or for the Government for government purposes without the payment to me of any royalties thereon.

BACKGROUND OF THE INVENTION

Multiple-pass laser configurations are frequently used in lasers to fill an active laser medium with a single oscillating mode even though the laser region may have a large Fresnal number. However, when the adjacent passes of optical radiation through the laser medium lie too close to one another, the overlap of energy from one beam to another can regenerate to form a parasitic oscillation within the device. This parasitic is undesirable because it increases mirror flux loading and robs the output beam of laser energy. Thus if the consecutive mirrors of a multi-pass laser system are positioned to almost face each other, a parasitic oscillation can be set up between them. A conventional techique for suppressing these is to space the mirrors apart. This has the disadvantage of extending the size of the laser, which causes unnecessary weight in the device. Moreover, in a chemical laser or similar device with a short storage time within the laser medium, laser excitation is wasted because of the regions between the optical path where no radiation is present to extract the laser energy.

SUMMARY OF THE INVENTION

In the polarization suppression of parasitic modes within a multi-pass laser system internal parasitics caused by overlap of laser radiation on successive passes through a laser oscillator or amplifier are suppressed. This eliminates wasted laser medium and shortens the length of the laser device by permitting adjacent optical paths to be very close to each other, improving laser design and increased operating efficiency. Suppression of parasitic modes in the multi-pass laser optical system incorporates means for selecting a single polarization, plane or circular, of laser radiation insuring that diffracted radiation will be suppressed, and means for altering the polarization of the radiation so that any two immediately adjacent optical passes have orthogonal polarizations.

DESCRIPTION OF THE PREFERRED EMBODIMENT

In a multi-pass laser optical system, means for altering polarization of laser radiation so that any two immediately adjacent optical passes have orthogonal polarization insures that any laser radiation diffractively coupled from one beam into an adjacent beam will have a polarization orthogonal to the radiation already present in the latter beam. Additional means for selecting a single polarization of laser radiation results in any diffracted radiation not being capable of sustaining a strong laser mode itself, and thus being suppressed.

Figure 1:
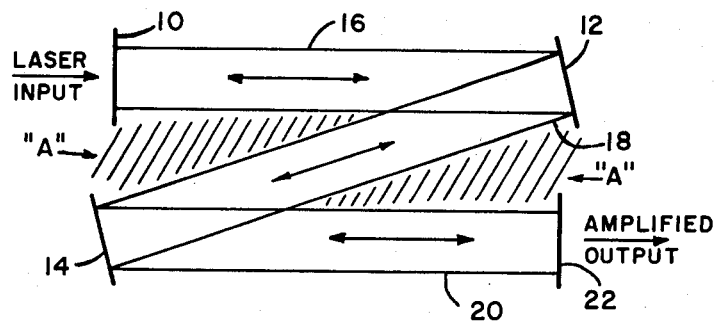
FIG. 1 is a typical prior art technique for suppressing parasitics in a multi-pass laser system.

Referring now to the drawings wherein like numbers represent like parts in the drawings, FIG. 1 discloses a typical conventional prior art structure for suppressing parasitics in a multi-pass laser amplifier to oscillator wherein respective mirros 12 and 14 reflect laser energy along the optical paths 16, 18 and 20. Adjacent paths 16–18 and 18–20 are separated and made less than parallel by region "A". Output energy is coupled from output mirror or means 22. While spacing the mirrors apart suppresses parasitics, it has the disadvantage of extending the size of the laser device causing unnecessary weight and, in chemical lasers with a short storage time within the laser medium, laser excitation is wasted because of the regions A where no radiation is present to extract laser energy. When region A is reduced, making the respective paths more parallel, the mirrors are moved closer together leading to parasitics in the three-pass laser oscillator since the beams are closer together and parallel. Also, with the various mirrors placed nearly parallel and coaxial to one another, spurious parasitic modes can arise directly between two mirrors such as 12 and 14. In the publication "Applied Physics Letters", volume 17, number 7, pages 278–281, Oct. 1, 1970, operating characteristics of a chemical laser is disclosed by T. A. Cool et al wherein an optical cavity has five folded optical paths (FIG. 1, page 279) whereby laser power is extracted from exhausting gasses. Appropriate misalignment of mirros from the parallel prevents parasitic oscillations.

Figure 2:
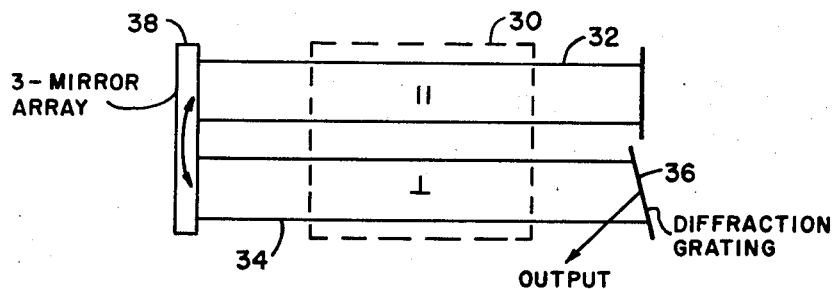
FIG. 2 is a simplified view of a multi-pass laser system for suppressing parasitics with optical paths close together.

FIG. 2 shows how the present inventon permits saturating the laser medium 30 by two closely spaced paths 32 and 34 providing optical passes without establishing destructive parasitic oscillations. A diffraction grating selects one plane polarization (parallel or perpendicular) and provides an output. A three-mirror array 38 has the effect of changing the polarization from one plane to an orthogonal plane, so that the beams in adjacent paths 32 and 34 have orthogonal plane polarizations with respect to each other. Thus, for example, with a diffraction grating adapted for reflection of 80% of the perpendicular polarization and essentially 0% of the parallel polarization, laser radiation in the beam of path 34 will have perpendicular polarization and the beam of path 32 will have parallel polarization. Diffractive coupling between the beams puts energy into the opposite polarization. However, perpendicularly polarized energy diffractively coupled from path 34 into path 32 will be parallel polarized after it circulates through the cavity back into path 34 to the diffraction grating. Since the grating returns essentially none of that energy, coupling it out of the cavity instead, oscillation cannot be sustained on a different polarization mode from that established for the device. Obviously any parallel polarized energy diffractively coupled from path 32 into path 34 will pass through the grating without substantial coupling back through the cavity. Thus perpendicular-parallel discrimination in adjacent paths allows close proximity of the optical paths. The return reflections from a grating can be made as high as 97% using conventional gratings, and gratings can be made substantially 100% to 0% discriminatory for either polarization as has been noted by Wirgin in the Journal of the Optical Society of America, volume 59, page 1348, October 1969.

Figure 3:
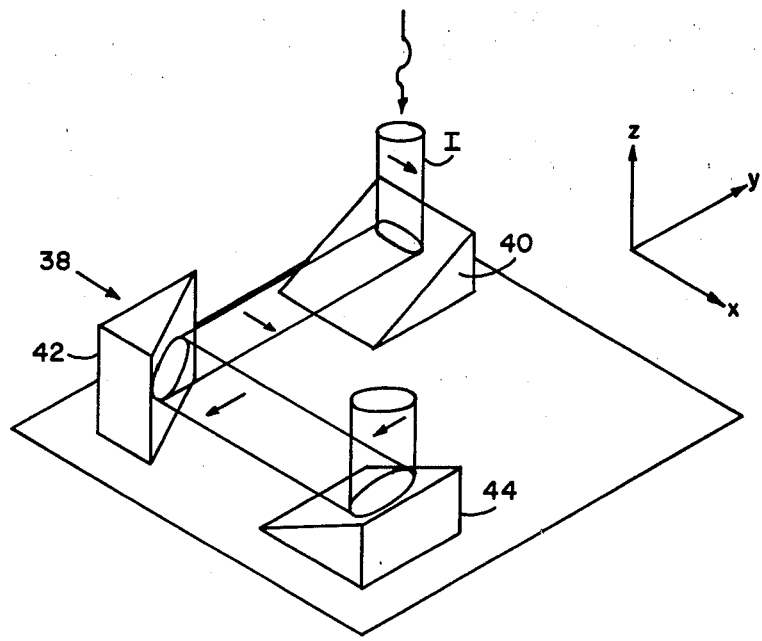
FIG. 3 is a preferred embodiment of a three-mirror array that converts one plane polarization into the orthogonal plane polarization.

A three-mirror array 38 that converts one plane polarization into the orthogonal plane polarization is shown in FIG. 3. An incident beam I, traveling toward $-z$, has plane polarization in the $+x$ direction as shown by the vector arrow of the beam. Beam I reflects from a plane mirror 40 whose surface is parallel to the plane $y=z$. This deflects the beam I in the $-y$ direction with polarization still in the $+x$ direction. A second mirror 42 parallel to the plane $x+y=o$ reflects the beam toward the $+x$ direction, with polarization in the $-y$ direction. Mirror 44, parallel to the plane $x=z$, reflects the beam in the $+z$ direction with polarization in the $-y$ direction. Thus, the direction of the beam has been reversed and it has been changed to orthogonal plane polarization. One or more mirrors may be used as desired for forming a stable or unstable laser optical cavity. For circular beams, the most compact arrangement appears to be three identical 45° elliptical mirrors. For a square beam, the mirrors are still identical but are rhombuses instead. Obviously other variations exist as well as these.

Figure 4:
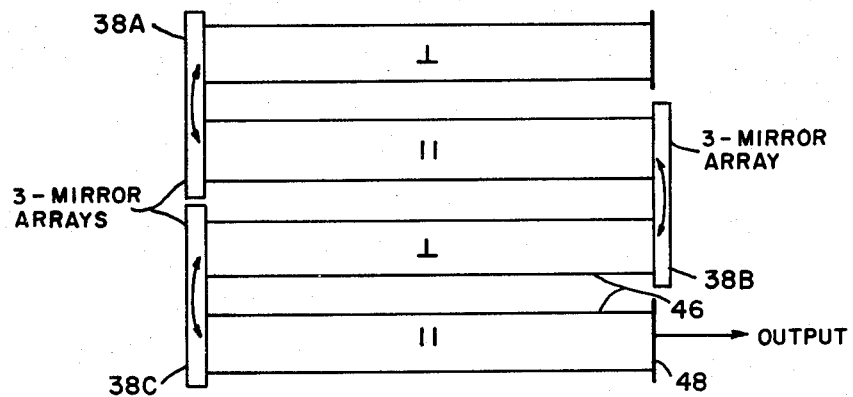
FIG. 4 is a larger multi-pass system in which polarization selection for respective optical paths is by three-mirror arrays.

FIG. 4 discloses a large multi-pass system utilizing three mirror arrays 38A, 38B, and 38C and four parallel paths 46. Adjacent paths are alternately parallel (||) or perpendicular (⊥) in polarization. Polarization selection can be incorporated into the three-mirror arrays, either by replacing one of the mirrors by a grating, or by introducing polarizaton selective elements such as Brewster windows into the arrays. The polarization alternates from parallel to perpendicular with respect to a preselected external axis as the beam passes through the system. Output means 48 may be a transmitting mirror, or diffraction grating.

Figure 5:
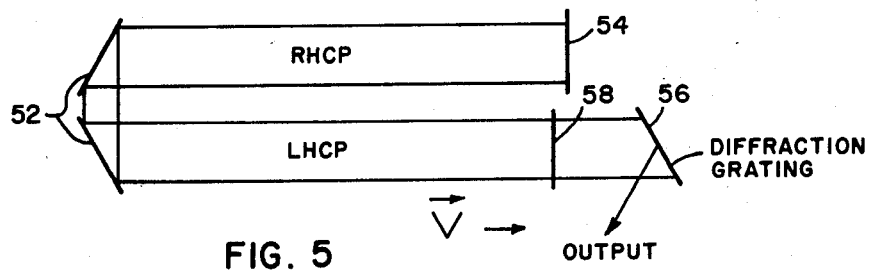
FIG. 5 is an alternative embodiment for circular polarization.

FIG. 5 discloses a system using circular polarization. A two-mirror array 52 with mirror 54 and grating 56 establish parallel beam paths and provide an output from gating 56. A quarter-wave plate 58 and the diffraction grating 56 together select a single circular polarization for the laser radiation. In the example of FIG. 5, the beam has left hand circular polarization (LHCP) for both directions of travel through the quarter wave plate. Circular polarizations are given with respect to an external vector V, not with respect to the direction of travel of the radiation. Thus, in the upper beam, the radiation is right hand circular polarized (RHCP) in both directions with respect to V. The two mirror array consists of two mirrors tilted at 45° with respect to the optical axis and have the effect of changing the radiation polarization as shown.

Figure 6:
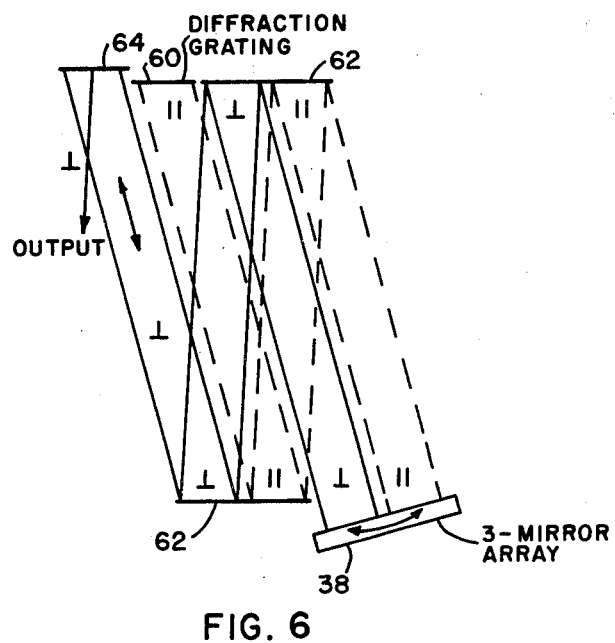
FIG. 6 is a preferred embodiment of a multi-pass system having several orthogonal polarization paths with only a single three-mirror array.

FIG. 6 shows a more elaborate embodiment for alternating the polarizations in a multi-pass system, using fewer three-mirror arrays than that of FIG. 4. Essentially two multi-pass systems of the type shown in FIG. 1 are interfaced and are adapted to have orthogonal polarization so that interaction due to diffractive coupling does not occur. A single three-mirror array 38 suffices to couple the two systems together and one diffraction grating 60 can be used to fix the polarization in the main beam. Obviously more than one diffraction grating could be used to remove unwanted diffractive coupling at selected intervals along the optical path. Mirrors 62 serve to reflect respective perpendicular and parallel polarized radiation in adjacent paths, while output means 64 couples out some of the laser power. Output means 64 may be a partially reflective mirror or a diffraction grating.

Although particular embodiments of this invention have been illustrated, it is apparent that various modifications of the invention may be made by those skilled in the art without departing from the scope and spirit of the foregoing disclosure. Accordingly the scope of the invention should be limited only by the claims appended hereto.

I claim:

1. In a multi-pass laser system wherein optical radiation through the laser medium passes through a plurality of closely adjacent optical paths for providing a single oscillating mode, the improvement of: means for selecting a single polarization of laser radiation, and means for altering the polarization of the radiation so that any two immediately adjacent optical passes have orthogonal polarizations.

2. In a multiple pass laser system as set forth in claim 1 the improvement wherein said means for altering the polarization is a three-mirror array for coupling optical energy between immediately adjacent optical paths.

3. In a multiple pass laser system as set forth in claim 2 the improvement wherein said means for selecting a single polarization is a diffraction grating.

4. In a multiple pass laser system as set forth in claim 1 the improvement wherein said means for altering the polarization is a plurality of three-mirror arrays, each of said arrays being adapted for coupling optical energy between immediately adjacent optical paths for providing a single oscillating mode.

5. In a multiple pass laser system as set forth in claim 1 the improvement wherein said means for altering the polarizaton is a two-mirror array, the two mirrors being tilted at 45° with respect to the optical axis.

6. In a multiple pass laser system as set forth in claim 5 the improvement wherein said means for selecting a single polarization is a quarter-wave plate and a diffraction grating.

* * * * *